Figure 1:
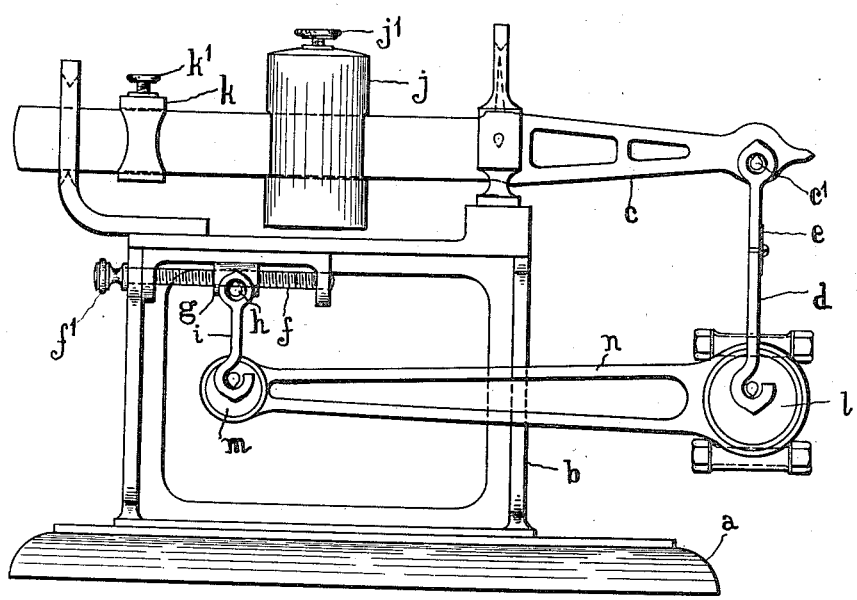

A. W. BROWN.
APPARATUS FOR TESTING OR PROVING THE CENTER OF GRAVITY OF CONNECTING RODS.
APPLICATION FILED FEB. 24, 1913.

1,124,389.

Patented Jan. 12, 1915.

2 SHEETS—SHEET 1.

Witnesses:

Inventor,
Alfred W. Brown
by Finckel & Finckel
Attorney.

A. W. BROWN.
APPARATUS FOR TESTING OR PROVING THE CENTER OF GRAVITY OF CONNECTING RODS.
APPLICATION FILED FEB. 24, 1913.

1,124,389.

Patented Jan. 12, 1915.

2 SHEETS—SHEET 2.

Witnesses:

Inventor:
Alfred W. Brown
by Finckel & Finckel
Attorneys

UNITED STATES PATENT OFFICE.

ALFRED W. BROWN, OF SOHO FOUNDRY, NEAR BIRMINGHAM, ENGLAND.

APPARATUS FOR TESTING OR PROVING THE CENTER OF GRAVITY OF CONNECTING-RODS.

1,124,389. Specification of Letters Patent. Patented Jan. 12, 1915.

Application filed February 24, 1913. Serial No. 750,445.

*To all whom it may concern:*

Be it known that I, ALFRED WILLIAM BROWN, a subject of the King of Great Britain, residing at Soho Foundry, near Birmingham, in the county of Stafford, England, have invented certain new and useful Improvements in Apparatus for Testing or Proving the Center of Gravity of Connecting-Rods, of which the following is a specification.

This invention relates to an improved means of standardizing or proving the position of the center of gravity on the longitudinal axis of connecting rods of reciprocating engines or the like.

The object of the invention is to ascertain or verify during the progress of manufacture the position of the center of gravity of the connecting rods on the longitudinal axis, to insure that each connecting rod is uniform and consonant with a standard, for the purpose of correctly balancing the engine, and attaining smoothness of working and enhanced efficiency. This object is particularly essential to the balancing of high speed engines of the internal combustion and compound cylinder type as used on automobiles, aeroplanes, and the like.

The invention comprises a suitable base and standard or frame, a balancing device associated with the standard or frame and suitable means for supporting one end of the beam or rod from the balancing device and the other end of the rod or beam from the standard or frame.

In the embodiment of the invention shown the balancing device comprises a beam or lever having knife-edged supports. From one arm of the beam or lever is suspended by suitable links the crank-end of the connecting rod, the gudgeon pin end being suspended by means of links from the standard or frame, this suspension being longitudinally adjustable by means of a nut and screw or the like, for the purpose of adaptability to different lengths of connecting rods. The other arm of the said beam or lever is provided with adjustable poise weights or other weight counterbalancing means, the purpose of said weights or the like being to obtain the weight of the dependent end of the connecting rod, suspended from the beam or lever. The connecting rod is horizontally suspended through the said linkage by means of two mandrels having knife-edge trunnions, said mandrels being arranged to accurately fit within the bearings of the connecting rod, and when so fitted the knife-edges thereof are co-axial with the internal diameter of the said bearings.

A means of carrying my invention into effect will now be described in conjunction with the accompanying drawings, like letters having reference to like parts in the several views.

Figure 2:
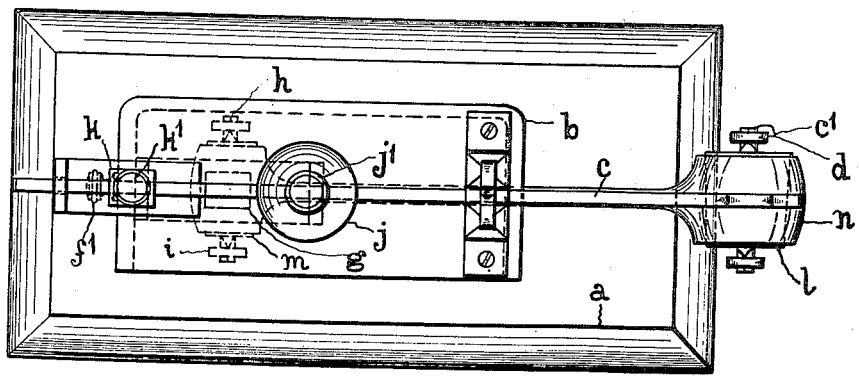
Figure 3:
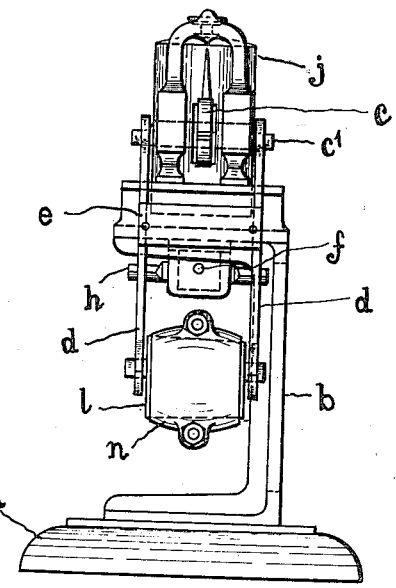
Figure 4:
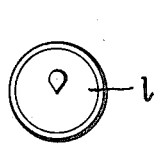
Figure 5:
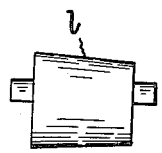

Figure 1 is a side elevation of one construction of my apparatus. Fig. 2 is a plan of Fig. 1. Fig. 3 is an end elevation of Fig. 1. Figs. 4 and 5 are end and side elevations of the mandrel employed in conjunction with this apparatus.

The base $a$ carries a standard or frame $b$ in which is fulcrumed a knife-edged beam or lever $c$. Dependent from a knife-edge $c'$ in the beam are links $d$ tied together by the bar $e$ to prevent displacement. Having bearings in the standard or frame $b$ is a screw $f$ provided with a milled head $f'$, upon the screw is a nut $g$ having knife-edged trunnions $h$ thereon from which depend the links $i$, by revolving the milled end of the screw, the nut is traversed thereon, to provide adjustment to suit varying lengths of connecting rods, and retain the vertical alinement of the links $d$ and $i$.

Upon the beam or lever $c$ are traversing poise weights $j$ and $k$ provided respectively as the major and minor means of determining or counterbalancing the weight, as will hereinafter be more fully set forth.

$l$ and $m$ are the mandrels having knife-edged trunnions, the edges being exactly on the axes of the mandrels. The peripheries of the said mandrels are slightly coned, or provided with a bevel, so that they may be readily inserted in the connecting rod $n$ and removed therefrom for the test.

The method of standardizing or proving the connecting rods by the employment of the said device will now be described. A standard connecting rod of approved construction (for example $n$ Figs. 1 to 3) is suspended by means of the mandrels $l$ and $m$ from the beam $c$ and nut $g$ on the frame $b$, by means of the links $d$ and $i$. The adjustable poise weights $j$ and $k$ are set, and secured by the screws $j'$ and $k'$ at the position of equilibrium of the beam $c$ the crank end of the connecting rod $n$ being suspended from the beam. The gudgeon pin end of the connecting rod is longitudinally adjusted by means of the traversing nut $g$ and screw $f$ to obtain a vertical suspension of the links carrying the mandrels in the connecting rod ends. The standard connecting rod is now removed from the beam and frame, and the mandrels withdrawn and other connecting rods of the same type, which it is desired to prove by the standard, have the mandrels inserted in their bearings and are suspended from the beam and frame as previously described, and if a position of equipoise of the beam is attained, the connecting rods are correct, but should the beam not be counterbalanced the connecting rod is removed and so altered until the beam or lever $c$ is brought into equilibrium, thereby insuring that the center of gravity of all the connecting rods on their longitudinal axes are standardized and uniform.

I claim:—

1. In an apparatus for testing or proving the center of gravity of connecting rods or the like, the combination of a frame, a balancing device associated therewith, means connected with the balancing device for pivotally supporting one end of the rod to be tested and means connected with the frame for pivotally supporting the other end of said rod.

2. In apparatus for testing or proving the center of gravity of connecting rods or the like, a beam or lever having poise weights thereon, means of suspending from said beam one part of a connecting rod, a frame carrying said beam or lever, an adjustable suspension on said frame for the other part of said rod, and mandrels adapted to be inserted within the bearings of said connecting rod by means of which the connecting rod is accurately suspended.

3. In apparatus for testing or proving the center of gravity of connecting rods or the like, a beam or lever provided with counterbalancing poise weights, a frame in which the beam is mounted, an adjustable trunnion therein, knife-edged mandrels and links by which the same are suspended one from the beam and the other from the trunnion, all for accurately suspending connecting rods in the manner described and for the purpose set forth.

4. In an apparatus for testing or proving the center of gravity of connecting rods or the like, the combination of a frame, a balancing device associated therewith, means connected with the balancing device for pivotally supporting one end of the rod to be tested, and means connected with the frame and adjustable toward and from the first-named means for pivotally supporting the other end of said rod.

5. In an apparatus for testing or proving the center of gravity of connecting rods or the like, the combination of a frame, a beam or lever fulcrumed on the frame, means connected with the beam or lever for pivotally supporting one end of the rod to be tested, and means connected with the frame for pivotally supporting the other end of said rod.

6. In an apparatus for testing or proving the center of gravity of connecting rods or the like, the combination of a frame, a beam or lever fulcrumed intermediate its ends on said frame, movable poise weights on one arm of said beam or lever, means connected with the other arm of the beam or lever for pivotally suspending one end of the rod to be tested, and means connected with the frame for pivotally suspending the other end of said rod.

In testimony whereof I affix my signature in presence of two witnesses.

ALFRED W. BROWN.

Witnesses:
GEORGE E. FOLKES,
ERNEST TUCKER.